US00RE50323E

(19) United States
(12) Reissued Patent
Itou et al.

(10) Patent Number: US RE50,323 E
(45) Date of Reissued Patent: Mar. 4, 2025

(54) LUBRICANT GUIDING STRUCTURE IN AUTOMATIC TRANSMISSION

(71) Applicants: JATCO Ltd, Fuji (JP); NISSAN MOTOR CO., LTD., Yokohama (JP)

(72) Inventors: Tsutomu Itou, Fujinomiya (JP); Tou Ou, Numazu (JP); Shinji Higashide, Fukuroi (JP); Yoshiteru Ueno, Mishima (JP)

(73) Assignees: JATCO LTD, Fuji (JP); NISSAN MOTOR CO., LTD., Yokohama (JP)

(21) Appl. No.: 17/988,657

(22) Filed: Nov. 16, 2022

Related U.S. Patent Documents

Reissue of:
(64) Patent No.: 10,837,541
Issued: Nov. 17, 2020
Appl. No.: 16/084,903
PCT Filed: Feb. 10, 2017
PCT No.: PCT/JP2017/004841
§ 371 (c)(1),
(2) Date: Sep. 13, 2018
PCT Pub. No.: WO2017/159146
PCT Pub. Date: Sep. 21, 2017

(30) Foreign Application Priority Data

Mar. 14, 2016 (JP) ..... 2016-049658

(51) Int. Cl.
*F16H 57/04* (2010.01)
*F16H 7/06* (2006.01)
*F16H 57/05* (2006.01)

(52) U.S. Cl.
CPC ..... *F16H 57/0423* (2013.01); *F16H 7/06* (2013.01); *F16H 57/04* (2013.01);
(Continued)

(58) Field of Classification Search
CPC .. F16H 57/04; F16H 57/0423; F16H 57/0489; F16H 7/06
See application file for complete search history.

(56) References Cited

U.S. PATENT DOCUMENTS 1,960,693 A * 5/1934 Bryant ..... F16H 57/0421 184/15.1
2,492,267 A * 12/1949 Burrows ..... B61F 17/18 184/11.1

(Continued)

FOREIGN PATENT DOCUMENTS

JP 2000-199436 A 7/2000
JP 2012-102818 A 5/2012
JP 2014-156878 A 8/2014

*Primary Examiner* — William E Dondero
(74) *Attorney, Agent, or Firm* — Foley & Lardner LLP

(57) ABSTRACT

Provided is a lubricant guiding structure in an automatic transmission in which a baffle plate configured to regulate the movement of a lubricant agitated by a driven sprocket is provided at one side, where an oil pump is located, in the direction of a rotational axis of the driven sprocket. As viewed from the rotational axis direction, a division wall disposed to extend across a chain is provided closer to the chain than a base of the baffle plate. As viewed from the rotational axis direction, the baffle plate is provided with a guide wall extending along a torque transmission-side chain of the chain wound on the driven sprocket. As viewed from the rotational axis-direction, the guide wall includes an inclined portion inclined in the direction coming closer to the chain as the distance to the distal end side decreases.

8 Claims, 3 Drawing Sheets

(52) U.S. Cl.
CPC ..... *F16H 57/0421* (2013.01); *F16H 57/0457* (2013.01); *F16H 57/0489* (2013.01); *F16H 57/05* (2013.01)

(56) References Cited

U.S. PATENT DOCUMENTS

| | | | | | |
|---|---|---|---|---|---|
| 5,273,136 | A * | 12/1993 | Martin | F16H 57/0421 | 184/6.12 |
| 7,712,581 | B2 * | 5/2010 | Billings | F16H 57/0489 | 184/13.1 |
| 2006/0060424 | A1 * | 3/2006 | Tominaga | F16H 57/0423 | 184/11.1 |
| 2006/0065487 | A1 * | 3/2006 | Tominaga | F16H 57/0408 | 184/6.12 |
| 2008/0072703 | A1 * | 3/2008 | Billings | F16H 57/0489 | 74/606 R |
| 2015/0240935 | A1 * | 8/2015 | Kampe | F16H 57/0489 | 474/91 |
| 2015/0337947 | A1 * | 11/2015 | Steward | F16H 57/0457 | 475/83 |
| 2015/0362024 | A1 * | 12/2015 | Shimazaki | F16H 57/0473 | 192/112 |
| 2016/0208866 | A1 * | 7/2016 | Palazzolo | F04B 53/18 | |
| 2017/0261092 | A1 * | 9/2017 | Ijichi | F16H 57/0457 | |
| 2018/0106359 | A1 * | 4/2018 | Kawakami | F16H 57/0483 | |
| 2018/0238434 | A1 * | 8/2018 | Zhang | F16H 57/05 | |

* cited by examiner

FIG. 1(a)
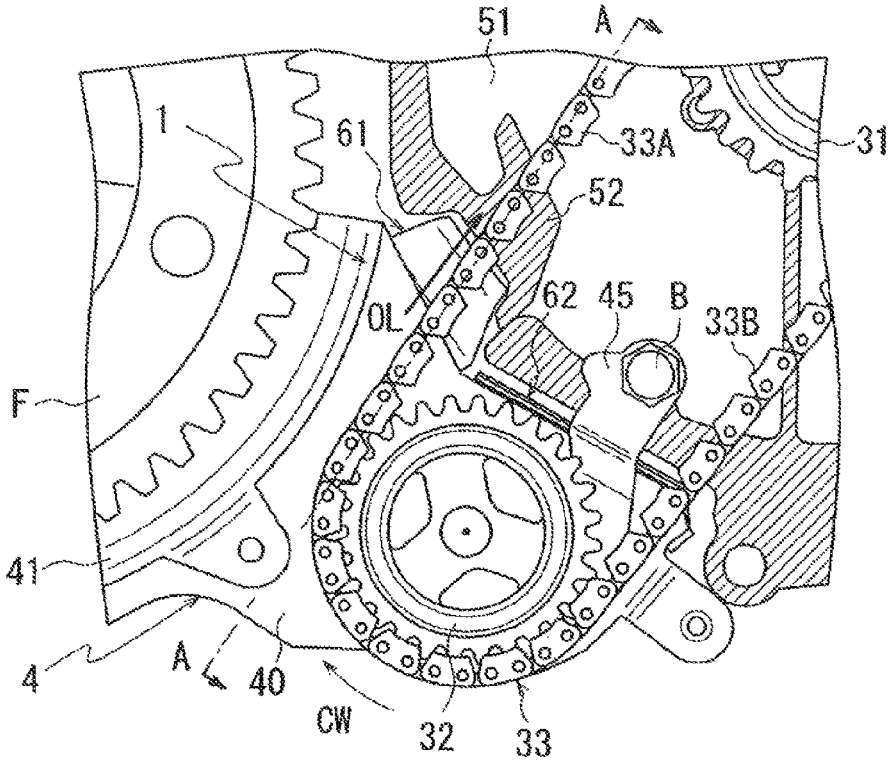
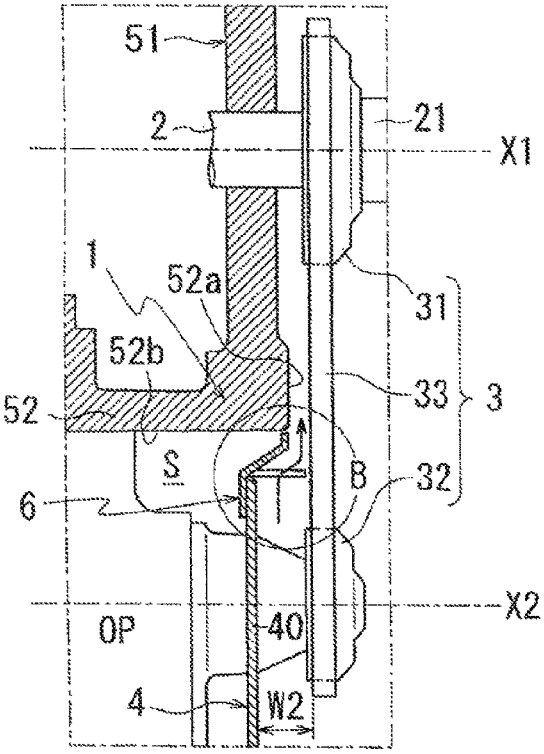
FIG. 1(b)
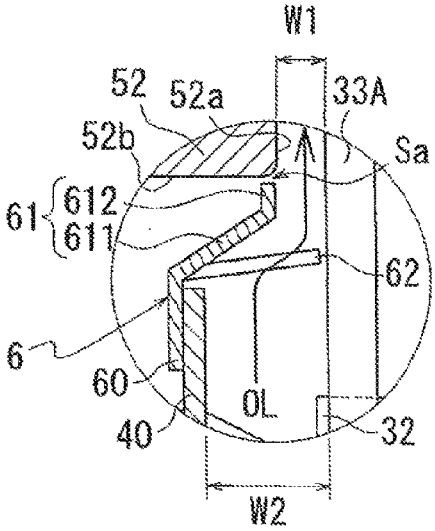
FIG. 1(c)

PRIOR ART

AMENDED

LUBRICANT GUIDING STRUCTURE IN AUTOMATIC TRANSMISSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a Reissue Application of U.S. Pat. No. 10,837,541, which issued on Nov. 17, 2020 from U.S. application Ser. No. 16/084,903, which is the U.S. National Stage of PCT/JP2017/004841, filed Feb. 10, 2017, which claims priority to Japanese Patent Application No. 2016-049658, filed Mar. 14, 2016, the entire contents of each of which are incorporated herein by reference.*

TECHNICAL FIELD

The present invention relates to a lubricant guiding structure in an automatic transmission.

BACKGROUND TECHNOLOGY

As shown in FIG. 4, as to an automatic transmission for a vehicle, one can be cited in which an oil pump OP is disposed at a position apart from an input shaft 110.

The automatic transmission having the oil pump OP is provided with a rotation transmission mechanism 100 including a drive sprocket 101 which is rotated by the rotation driving force of an engine, a driven sprocket 102 which is provided on the rotational shaft of the oil pump OP, and including a chain 103 which is wound on the drive sprocket 101 and the driven sprocket 102. The oil pump OP is driven by the rotation driving force transmitted therefrom through the rotation transmission mechanism 100.

Here, if the driven sprocket 102 of the rotation transmission mechanism 100 is arranged on the lower part side of a transmission case so as to be located inside a lubricant OL, at the time of the driving of the oil pump OP, the lubricant OL inside the transmission case is scooped by the driven sprocket 102.

The lubricant OL scooped by the driven sprocket 102 contains a lot of air bubbles, and if the lubricant OL containing a lot of the air bubbles moves as it is to the inside of an oil pan fixed to the lower part of the transmission case, the lubricant OL containing a lot of the air bubbles is absorbed from an oil strainer provided in the oil pan.

Therefore, in general, a baffle plate 104 is provided between the driven sprocket 102 and the oil pump OP, and by this baffle plate 104, the movement of the lubricant OL containing a lot of the air bubbles toward the oil pan is regulated. An installation example of such a baffle plate is disclosed in, for example, a patent document 1.

PRIOR ART REFERENCE

Patent Document

Patent Document 1: Japanese Patent Application Publication 2000-199436

In the transmission case, another rotational element (for example, a planetary gear mechanism) is provided adjacently to the drive sprocket 101. In case where the oil pump OP is disposed inside a space S on the radially outer side of a division wall 106 surrounding the peripheral edge of the other rotational element, the baffle plate 104 is also disposed inside the space S, so as not to be widened the setting range in the rotational direction of the components of the rotation transmission mechanism 100.

Here, when the oil pump OP is driven, the lubricant OL scooped by the driven sprocket 102 moves toward the drive sprocket 101 along the chain 103 on a torque transmission side between the chain 103 and the baffle plate 104.

However, when the baffle plate 104 is disposed inside the space S, the movement of the lubricant OL toward the drive sprocket 101 along the baffle plate 104 is prevented by the division wall 106 disposed to extend across the chain 103 when viewed from the direction of a rotational axis X2. Consequently, the scooped lubricant OL flows into the oil pump OP side passing through the gap between the division wall 106 and the baffle plate 104, following which it moves to the lower part on the oil pan side.

A sealing plate 107 made of rubber which seals the gap between the division wall 106 and the baffle plate 104 is therefore provided to the baffle plate 104 to control the moving direction of the scooped lubricant OL. However, the rubber sealing plate 107 is expensive and it takes a working cost to dispose the sealing plate 107 on the baffle plate 104 made of steel by being stuck thereon.

Therefore it has been required to control the moving direction of the lubricant containing a lot of the air bubbles by a lower-cost configuration.

SUMMARY OF THE INVENTION

In the present invention, a lubricant guiding structure in an automatic transmission, wherein the automatic transmission includes: a drive-side gear; a driven-side gear; and a chain through which a transmission of a rotation between the drive-side gear and the driven-side gear is performed, the lubricant guiding structure includes:

a baffle plate provided on one side in an rotational axis of the driven-side gear, the baffle plate which is configured to regulate a movement of a lubricant agitated by the driven-side gear to the one side, wherein, as viewed from a direction of the rotational axis, a division wall is provided on a drive-side gear side of the baffle plate, wherein, in the rotational axis direction, the division wall is provided closer to the chain than the baffle plate, wherein, as viewed from the rotational axis direction, the baffle plate is provided with a wall portion extending toward the drive-side gear along a torque transmission-side chain of the chain wound on the driven-side gear, and wherein, in the rotational axis direction, the wall portion is inclined in a direction coming closer to the chain as a distance to a distal end side of the wall portion decreases.

When the transmission of the rotation between the drive-side gear and the driven-side gear via the chain is performed, the lubricant scooped by the driven-side gear moves toward the drive-side gear along the torque transmission-side chain.

When configured as above, the moving direction of the lubricant moving along the torque transmission-side chain is changed by the inclined portion, and then the lubricant is guided to the space between the drive-side gear and the division wall.

BRIEF DESCRIPTION OF THE DRAWINGS

FIG. 1 is an explanatory view of a lubricant guiding structure according to an embodiment.

In the following, an embodiment of the present invention will be explained.

FIG. 1 is an explanatory view of a guiding structure 1 for a lubricant OL in an automatic transmission. FIG. 1(a) is an enlarged view around a driven sprocket 32. FIG. 1(b) is a schematic diagram showing a section A-A of FIG. 1(a), and an explanatory view of a flow of the lubricant OL toward a drive sprocket 31, after being scooped by the driven sprocket 32. FIG. 1(c) is an enlarged view of an area B of FIG. 1(b).

In addition, in FIG. 1(a), the region of a division wall 52 is shown by being hatched, for clearly showing the position of the division wall 52.

Figure 2A:
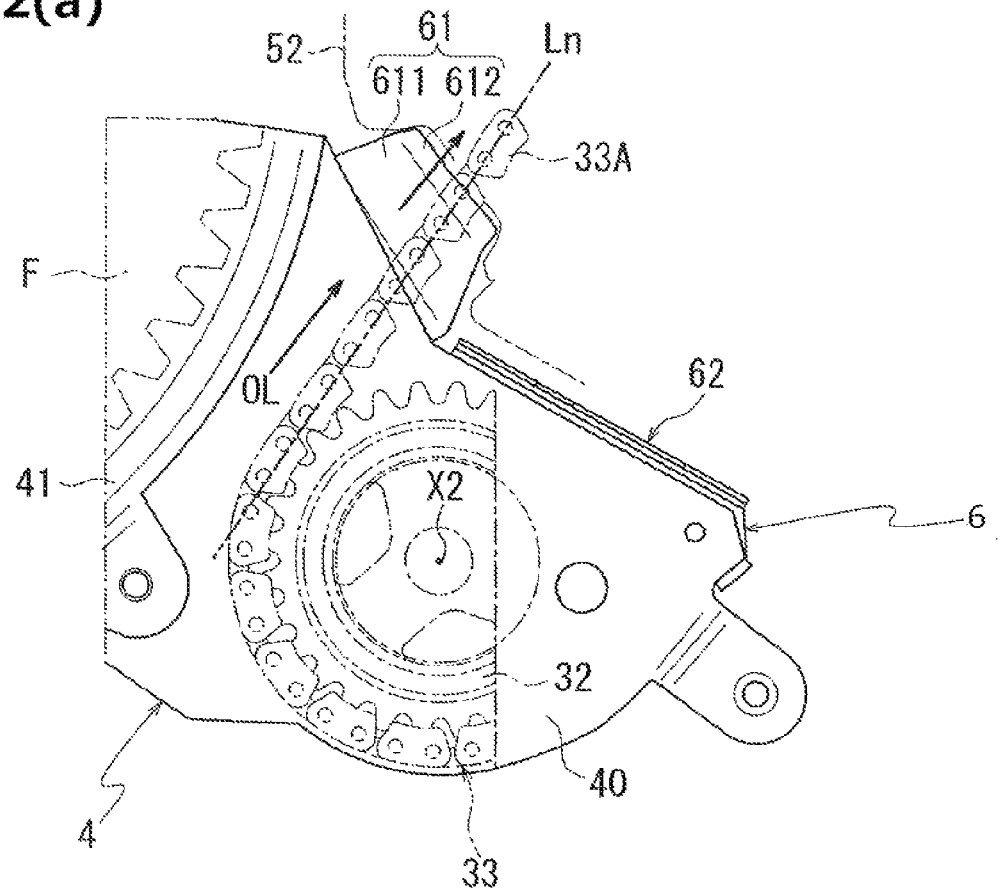
FIG. 2 is an explanatory view of a baffle plate and a guiding member.
Figure 2B:
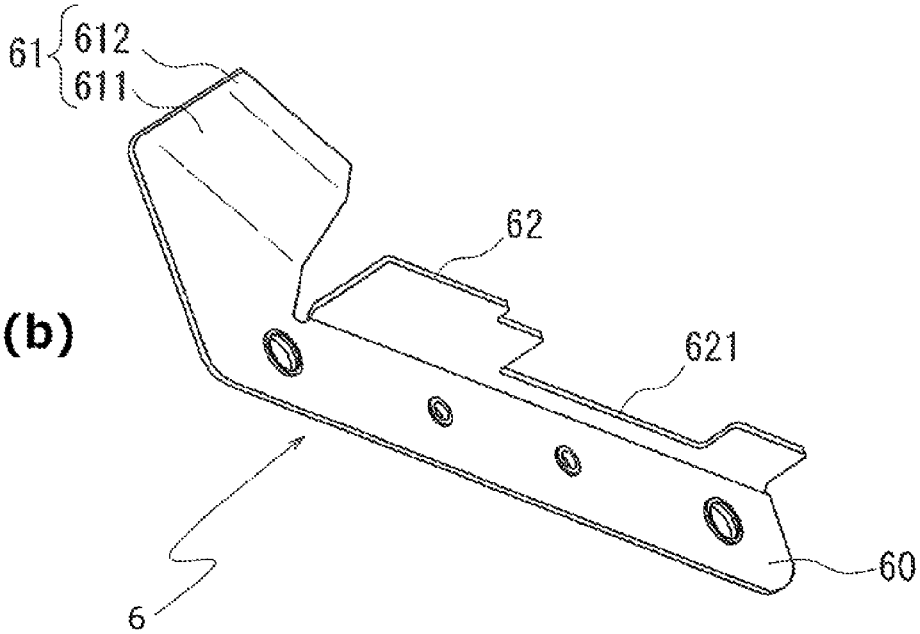

FIG. 2 is an explanatory view of a baffle plate 4 and a guide member 6. FIG. 2(a) is an explanatory view of a flow of the lubricant OL around a guide wall 61 of the guide member 6. FIG. 2(b) is a perspective view of the guide member 6.

As shown in FIG. 1(b), in the inside of a transmission case of the automatic transmission for a vehicle, an oil pump OP is disposed on the radially outer side of an input shaft 2 to which the output rotation of a torque converter (not shown in the drawings) is input.

This oil pump OP is driven by a rotation driving force transmitted via a rotation transmission mechanism 3. This rotation transmission mechanism 3 is configured of a drive sprocket 31 rotating around a rotational axis X1, a driven sprocket 32 rotating around a rotational axis X2 parallel to the rotational axis X1, and of a chain 33 wound on the drive sprocket 31 and the driven sprocket 32.

The drive sprocket 31 is connected to a pump impeller sleeve 21 extending from the torque converter (not shown in the drawings) side, and is rotated around the rotational axis X1 by a rotation driving force from a power source (for example, an engine) which is input via the pump impeller sleeve 21.

The rotation input to the drive sprocket 31 is transmitted to the driven sprocket 32 via the chain 33, and when the driven sprocket 32 rotates around the rotational axis X2 by the transmitted rotation, the rotational shaft of the oil pump OP to which the driven sprocket 32 is connected rotates, and the oil pump OP is driven.

In the inside of the transmission case, another rotational element (for example, a planetary gear mechanism) is disposed adjacent to the drive sprocket 31, and a compartment wall 51 through which the input shaft 2 penetrates is disposed between the other element and the drive sprocket 31.

On the basis of the rotational axis X1, the division wall 52 surrounding the other rotational element is connected on the outer diameter side of the compartment wall 51, and a space S in which the oil pump OP is disposed is formed on the outside in the radial direction of the division wall 52.

The space S in the transmission case is located at the lower part at which the lubricant OL is stored, and the oil pump OP and the driven sprocket 32 are located in the lubricant OL.

Consequently, when the oil pump OL is driven, the driven sprocket 32 rotating around the rotational axis X2 scoops the lubricant OL.

As shown in FIG. 1(a), in the embodiment, the driven sprocket 32 rotates only in a clockwise direction in the drawing (in the drawing, an arrow CW direction), and the chain 33 wound on the drive sprocket 31 and the driven sprocket 32 moves in the clockwise direction in the drawing, and the rotation of the drive sprocket 31 is transmitted toward the driven sprocket 32.

Here, in FIG. 1(a), in the chain 33 wound on the driven sprocket 32, the left side thereof in the drawing on which a final gear F is located is a chain 33A on a torque transmission side (tension side), and the right side thereof is a chain 33B on a torque non-transmission side (loose side).

In addition, in the following explanation, in case where these chains 33A and 33B are not especially distinguish, it is simply written as the chain 33.

As shown in FIG. 1(b), the baffle plate 4 which is configured to adjust the moving direction of the lubricant OL scooped by the driven sprocket 32 is provided between the driven sprocket 32 and the oil pump OP.

The baffle plate 4 includes a base 40 having a plate shape which is disposed in a direction orthogonal to the rotational axis 2X, and is located inside the same space S as the oil pump OP.

When viewed from the rotational axis X2 direction, the base 40 of the baffle plate 4 has an area covering a range larger than the outer diameter of the chain 33 wound on the driven sprocket 32 to prevent the movement of the lubricant OL scooped by the driven sprocket 32 toward the oil pump OP (see FIG. 2(a))

In the base 40, on the bases of the rotational axis X2, an arcuate compartment wall 41 surrounding the outer periphery of the final gear F at a predetermined interval is disposed on the outer side from the torque transmission-side chain 33A.

The compartment wall 41 is formed by expanding a part of the region of the base 40 to the front side when viewed on a paper in FIG. 2(a). The region of the base 40 which is opposite to the oil pump OP is partitioned into the region at which the driven sprocket 32 is disposed and the region at which the final gear F is disposed by the compartment wall 41.

Consequently, the lubricant OL scooped by the driven sprocket 32 moves to the upper side in FIG. 2(a) along the compartment wall 41 together with the chain 33A moving toward the drive sprocket 31.

As shown in FIG. 1(b), the baffle plate 4 is located in the space S on the outer side of the division wall 52. The division wall 52 is provided on the chain 33 side more than the baffle plate 4 (right side in the drawing).

Consequently, an end surface 52a of the division wall 52 facing the chain 33 is located on the chain 33 side more than the base 40 of the baffle plate 4, and a clearance W1 between the end surface 52a of the division wall 52 and the chain 33 is narrower than a clearance W2 between the base 40 of the baffle plate 4 and the chain 33.

Here, when viewed from the rotational axis X2 direction, the division wall 52 is disposed to extend across the chain 33 (see FIG. 1(a)), and an outer periphery 52b of the division wall 52 is located on the outside in the radial direction of the baffle plate 4 with the rotational axis X2 as a reference (see FIG. 1(b) and FIG. 1(c)).

Consequently, the outer periphery 52b of the division wall 52 is located to cross the moving direction of the lubricant OL moving toward the drive sprocket 31, which is scooped by the driven sprocket 32. In the embodiment, the guide member 6 guiding the movement of the lubricant OL is disposed to the baffle plate 4, to prevent the movement of the lubricant OL from being inhibited by the outer periphery 52b of the division wall 52.

As shown in FIG. 2(b), in the guide member 6, the guide wall 61 for the lubricant OL is disposed on one end side in the longitudinal direction of a plate-shaped connection portion 60. This guide wall 61 is configured of the inclined portion 611 which is inclined at a predetermined angle with respect to the connection portion 60 and of a flat portion 612 parallel to the connection portion 60.

As shown in FIG. 2(a), when viewed from the rotational axis X2, the guide wall 61 extends in a direction away from the connection portion 60 (in a direction coming closer to the drive sprocket 31) along the torque transmission-side chain 33A, and a virtual line Ln along the continuous direction of the chain 33 is set so as to be located in the substantially middle in the width direction of the guide wall 61, and thereby the position of the chain 33 is overlapped with the position of the guide wall 61 when viewed from the rotational axis X2 direction.

When viewed from the rotational axis X2 direction, the width of the inclined portion 611 becomes narrower as the distance to the connection portion 60 increases, and the flat portion 612 extending from the distal end of the inclined portion 611 is formed in a direction away from the connection portion 60 with a substantially equal width.

The guide wall 61 is disposed so as not to interfere with the division wall 52, and a small gap Sa is secured between the guide wall 61 and the outer periphery 52b of the division wall 52 (see FIG. 1(c)).

The inclined portion 611 is inclined in a direction coming closer to the chain 33 as the distance to the connection portion 60 increases. The clearance between the flat portion 612 extending from the distal end of the inclined portion 611 and the chain 33 is the substantially the same as the clearance W1 between the end surface 52a of the division wall 52 and the chain 33.

Moreover, as shown in FIG. 2(b), a prevention wall 62 bent in the same direction as the guide wall 61 is disposed at the side edge on a side, on which the guide wall 61 is located, in the connection portion 60.

A cutout portion 621 is disposed at a middle position in the longitudinal direction of the prevention wall 62. This cutout portion 621 is disposed so as to avoid the prevention wall 62 from interfering with a fixing member 45 (see FIG. 1(a)) for fixing the baffle plate 4 to the division wall 52.

As shown in FIG. 1(c), in the rotational axis direction X2, as compared with the division wall 52, the prevention wall 62 is disposed close to the chain 33, and as shown in FIG. 1(a), when viewed from the rotational axis X2 direction, the prevention wall 62 is disposed along the division wall 52 between the torque transmission-side chain 33A and the torque non-transmission-side chain 33B in the chain 33 wound on the driven sprocket 32.

Consequently, in the region in the division wall 52 at which the prevention wall 62 is disposed, the movement of the lubricant OL scooped by the driven sprocket 32 toward the drive sprocket 31 is prevented by the prevention wall 62.

In the following, the function of the lubricant guiding structure 1 of the configuration will be explained.

When the oil pump OP is driven, the driven sprocket 32 rotates around the rotational axis X2, and the lubricant OL inside the transmission case is scooped.

With this, since the base 40 of the baffle plate 4 is located on the oil pump OP side of the driven sprocket 32 and, in this base 40, the compartment wall 41 surrounding the outer periphery of the final gear F is disposed on the outer side in the radial direction of the driven sprocket 32, the scooped lubricant OL moves toward the drive sprocket 31 along the torque transmission-side chain 33A.

Here, since the baffle plate 4 is located in the space S on the outer side of the division wall 52 with the rotational axis X1 as a reference, the outer periphery 52b of the division wall 52 is located so as to cross the moving direction of the lubricant OL moving along the torque transmission-side chain 33A.

When viewed from the rotational axis X2 direction, the baffle plate 4 is therefore provided with the guide wall 61 at a position overlapping with the chain 33A. This guide wall 61 is provided with the inclined portion 611 which is inclined in a direction in which the clearance with the chain 33 in the rotational axis X2 becomes narrower as the distance to the baffle plate 4 increases and the distance to the division wall 52 decreases.

Accordingly, the traveling direction of the lubricant OL moving along the chain 33A is changed at the guide wall 61 by the inclined portion 611 from the direction colliding with the outer periphery 52b of the division wall 52 to the direction approaching the chain 33A, and finally, it is guided to the clearance between the drive sprocket 31 and the division wall 52.

Furthermore, the flat portion 612 parallel to the chain 33A is disposed adjacent to the inclined portion 611, and when the lubricant OL passes through the flat portion 612, the traveling direction of the lubricant OL which had been changed by the inclined portion 611 is changed to a direction along the moving direction of the chain 33A.

After that, since the clearance between the flat portion 612 and the chain 33A is set to be the same as the clearance between the end surface 52a of the division wall 52 and the chain 33A, the lubricant OL which had passed through the guide wall 61 smoothly flows into the clearance between the end surface 52a of the division wall 52 and the chain 33A.

Moreover, even if the gap between the flat portion 612 and the division wall 52 exists, since the opening direction of the gap is substantially orthogonal to the moving direction of the lubricant OL, a large amount of the lubricant OL does not flow into the gap between the flat portion 612 and the division wall 52, and it moves toward the drive sprocket 31.

Then, the lubricant reaching the drive sprocket 31 side long the chain 33A finally moves to the lower part on the oil pan side from the torque non-transmission-side chain 33B. However, in a process of reaching the oil pan, air bubbles contained in the lubricant OL is reduced, and the content of the air bubbles in the lubricant OL sucked by an oil strainer in the oil pan decreases.

In addition, a part of the lubricant OL whose traveling direction is changed to the direction colliding with the division wall 52 between the chain 33A and the chain 33B without moving along the chain 33A collides with the prevention wall 62 having a height extending to the vicinity of the chain 33 as compared with the division wall 52.

With this, it is possible to suppress that, in the region between the torque transmission-side chain 33A and the torque non-transmission-side chain 33B, the lubricant OL containing a large amount of the air bubbles passes through the gap Sa between the baffle plate 4 and the outer periphery 52b of the division wall 52 and flows into the oil pump OP side of the baffle plate 4. Accordingly, it is possible to suitably suppress that the lubricant OL containing a large amount of the air bubbles moves from the oil pump OP side toward the oil pan and is sucked by the oil strainer.

As the above, in the embodiment, (1) the lubricant guiding structure 1 in the automatic transmission, wherein the automatic transmission includes: the drive sprocket 31 (drive-side gear); the driven sprocket 32 (driven-side gear); and the chain 33 through which the transmission of the rotation between the drive sprocket 31 and the driven sprocket 32 is performed, the chain 33 which is wound on the drive sprocket 31 and the driven sprocket 32, the lubricant guiding structure includes:

the baffle plate 4 provided on one side, on which the oil pump OP is located, in the rotational axis X2 of the driven sprocket 32, the baffle plate 4 which is configured to regulate the movement of the lubricant OL agitated by the driven sprocket 32 to the one side, wherein, as viewed from the direction of the rotational axis X2, the division wall 52 is provided on the drive sprocket 31 side of the baffle plate 4, wherein, in the rotational axis X2 direction, the end surface 52a of the division wall 52 is provided closer to the chain 33 than the base 40 of the baffle plate 4, wherein, as viewed from the rotational axis X2 direction, the baffle plate 4 is provided with the guide wall 61 (wall portion) extending toward the drive sprocket 31 along the torque transmission-side chain 33A of the chain 33 wound on the driven sprocket 32, and wherein, in the rotational axis X2 direction, the guide wall 61 includes the inclined portion 611 inclined in the direction coming closer to the chain 33 as the distance to the distal end side in the extending direction thereof decreases.

When the transmission of the rotation between the drive sprocket 31 and the driven sprocket 32 through the chain 33 is performed, the lubricant OL scooped by the driven sprocket 32 moves toward the drive sprocket 31 along the torque transmission-side chain 33A.

When configured as above, the moving direction of the lubricant OL moving along the torque transmission-side chain 33A is changed by the inclined portion 611 from the direction colliding with the outer periphery 52b of the division wall 52 to the direction coming close to the chain 33A, and finally it is guided to the clearance between the drive sprocket 31 and the division wall 52.

Consequently, it is possible to suppress the lubricant OL containing the air bubbles from moving toward the oil pan through the gap Sa between the baffle plate 4 and the division wall 52 without sealing the gap Sa by a rubber sealing material, and the moving direction of the lubricant OL can therefore be controlled, while the movement of the lubricant OL containing the air bubbles toward the oil pan is suppressed more simply at a lower cost.

(2) The clearance between the distal end (boundary with the flat portion 612) in the extending direction of the inclined portion 611 and the chain 33 in the rotational axis X2 direction is set equal to the clearance W1 between the end surface 52a of the division wall 52 and the chain 33 in the rotational axis X2 direction.

Here, the term "equal" also used in the description of the scope of the claim does not mean that the clearance between the distal end (boundary with the flat portion 612) in the extending direction of the inclined portion 611 and the chain 33 in the rotational axis X2 is exactly the same as (equal to) the clearance W1 between the end surface 52a of the division wall 52 and the chain 33 in the rotational axis X2.

An error in design, an error in forming and a deviation caused by the installation of the baffle plate 4 and the guide wall 61 are included, and the term should be interpreted as "substantially the same".

When configured as above, it is possible to properly guide the lubricant OL scooped by the driven sprocket 32 toward the drive sprocket 31.

(3) In the guide wall 61, the distal end in the extending direction of the guide wall 61 is provided with the flat portion 612 parallel to the chain 33 which is continuously provided to the inclined portion 611.

In case where the flat portion 612 is not disposed, the clearance with the chain 33 becomes wide at the time point when passing through the distal end of the inclined portion 611. Consequently, at the time point when the flow of the lubricant OL moving toward the drive sprocket 31 passes through the distal end of the inclined portion 611, it is diffused, and a part of the lubricant OL flows into the gap between the base 40 of the baffle plate 4 and the division wall 52.

In contrast to this, in case where the flat portion 612 is disposed, since the diffused flow of the lubricant OL is guided to the direction along the flat portion 612, even if there is the gap Sa between the flat portion 612 and the outer periphery 52b of the division wall 52, a large amount of the lubricant OL does not flow into the gap Sa, and it is therefore not necessary to seal the gap Sa by a seal material by separately preparing a rubber seal material having a complicated shape.

In particular, in the embodiment, the lubricant OL jumps over the gap Sa by controlling the moving direction of the lubricant OL by the guide wall 61, while leaving the gap Sa between the flat portion 612 of the baffle plate 4 and the outer periphery 52b of the division wall 52.

With this, when the lubricant OL on the drive sprocket 31 side moves downwardly to driven sprocket 32 side by its own weight, the lubricant OL moving by the own weight can be returned toward the oil pan through the gap Sa.

Therefore, it is possible to improve the returning of the lubricant at an extremely low temperature at which the returning of the lubricant OL to the oil pan deteriorates caused by the lowering of viscosity.

(4) In the baffle plate 4, the prevention wall 62 inclined in the same direction as the guide wall 61 is further included adjacent to the guide wall 61, as viewed from the rotational axis X2 direction, the prevention wall 62 is provided along the division wall 52 provided to extend across the chain 33, between the torque transmission-side chain 33A located on one side of the chain 33 wound on the driven sprocket 32 and the chain 33B located on the other side, and in the rotational axis X2 direction, the prevention wall 62 is provided closer to the chain 33 than the division wall 52.

When configured as above, in the region between the torque transmission-side chain 33A located on one side of the chain 33 wound on the driven sprocket 32 and the chain 33B located on the other side, the flow of the lubricant OL into the gap Sa between the baffle plate 4 and the division wall 52 can be suppressed.

(5) The guide wall 61 and the prevention wall 62 are provided integrally with the plate-shaped connection portion 60 of the guide member 6 which is provided separately from the baffle plate 4. The guide member 6 is connected to the baffle plate 4 by connecting the connection portion 60 to the surface on the oil pump OP side of the baffle plate 4.

When configured as above, the guide wall 61 for the lubricant OL can be provided without changing the shape of the existing baffle plate 4, and thereby the existing baffle plate 4 can be used as it is, for providing the guide wall 61.

Figure 3:
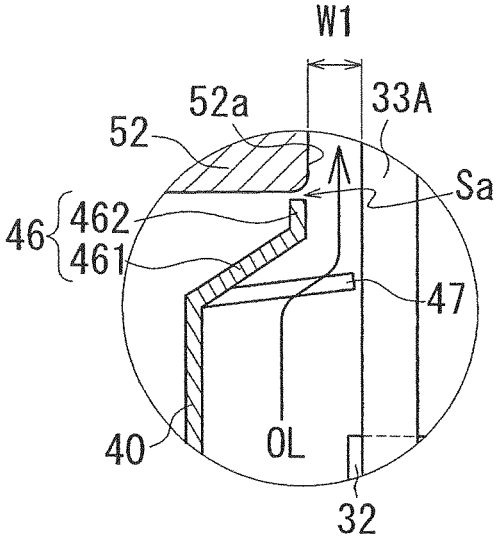
FIG. 3 is an explanatory view of a lubricant guiding structure according to a variation.
Figure 4:
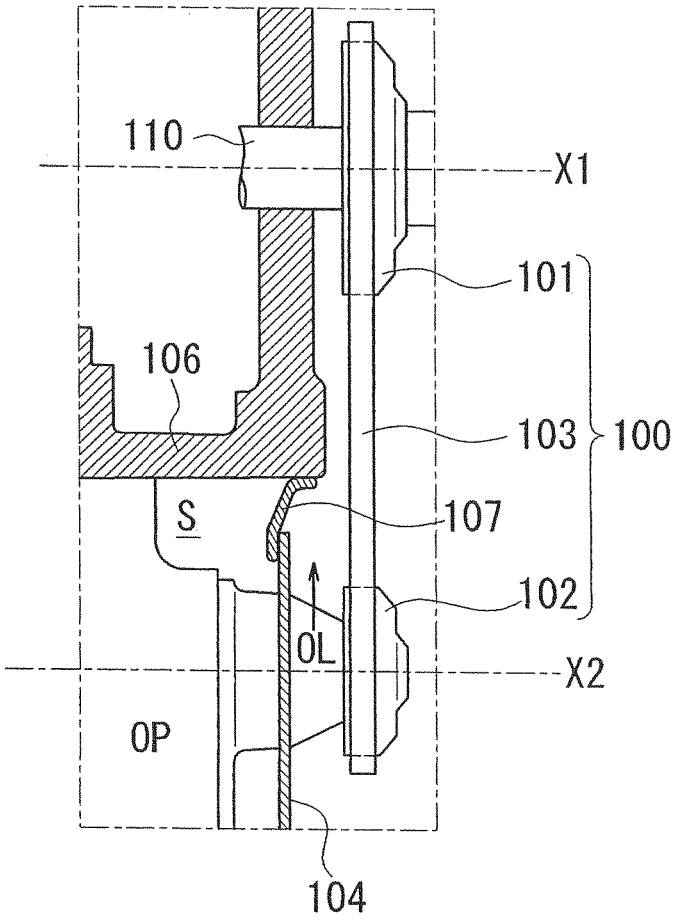
FIG. 4 is an explanatory view of an arrangement around a baffle plate according to a conventional embodiment.

In the embodiment mentioned above, although a case where the guide wall 61 and the prevention wall 62 are provided to the guide member 6 provided separately from the baffle plate 4 has been shown as an example, for example, as shown in FIG. 3, both of a guide wall 46 and a prevention wall 47 or at least one of them may be provided integrally with the baffle plate 4.

(5) That is, at least the guide wall 61 may be formed integrally with the baffle plate 4.

When configured as above, when the baffle plate is formed by punching a metal plate, the region to be the wall portion is also formed at the same time, and thereby the wall portion can be formed with a high position accuracy. In addition, in case where the wall portion is provided separately from the baffle plate, the positioning of the wall portion is required, and it takes a working cost to provide the wall portion to the baffle plate. However, in case where the baffle plate is integrally formed, it becomes possible to reduce the working cost.

The invention claimed is:

[1. A lubricant guiding structure in an automatic transmission, wherein the automatic transmission comprises:

a drive-side gear;

a driven-side gear; and a chain through which a transmission of a rotation between the drive-side gear and the driven-side gear is performed, the chain which is wound on the drive-side gear and the driven-side gear, the lubricant guiding structure comprising:

a baffle plate provided on one side in an rotational axis of the driven-side gear, the baffle plate which is configured to regulate a movement of a lubricant agitated by the driven-side gear to the one side, wherein, as viewed from a direction of the rotational axis, a division wall is provided on a drive-side gear side of the baffle plate, wherein, in the rotational axis direction, the division wall is provided closer to the chain than the baffle plate, wherein, as viewed from the rotational axis direction, the baffle plate is provided with a wall portion extending toward the drive-side gear along a torque transmission-side chain of the chain wound on the driven-side gear, and wherein, in the rotational axis direction, the wall portion is inclined in a direction coming closer to the chain as a distance to a distal end side of the wall portion decreases.]

[2. The lubricant guiding structure in the automatic transmission according to claim 1, wherein the wall portion is formed integrally with the baffle plate.]

[3. The lubricant guiding structure in the automatic transmission according to claim 1, wherein a clearance between a distal end in an extending direction of the wall portion and the chain in the rotational axis direction is set equal to a clearance between the division wall and the chain in the rotational axis direction.]

[4. The lubricant guiding structure in the automatic transmission according to claim 3, wherein the distal end in the extending direction of the wall portion is provided with a flat portion parallel to the chain.]

[5. The lubricant guiding structure in the automatic transmission according to claim 1, wherein, in the baffle plate, a partition wall inclined in the same direction as the wall portion is further included adjacent to the wall portion, wherein, as viewed from the rotational axis direction, the partition wall is provided along the division wall provided to extend across the chain, between the torque transmission-side chain located on one side of the chain wound on the driven-side gear and a chain located on the other side, and wherein, in the rotational axis direction, the partition wall is provided closer to the chain than the division wall.]

*6. An automatic transmission comprising:*

*a division wall;*

*a drive-side gear;*

*a driven-side gear;*

*a chain which is wound on the drive-side gear and the driven-side gear; and*

*a baffle plate,*

*wherein the baffle plate is provided with a base portion which covers a range larger than an outer diameter of the chain,*

*wherein, as viewed from a direction of a rotational axis of the driven-side gear, the chain is positioned more on a front side than the base portion of the baffle plate,*

*wherein, as viewed from the direction of the rotational axis of the driven-side gear, an end surface of the division wall is positioned more on the front side than the base portion of the baffle plate,*

*wherein, as viewed from the direction of the rotational axis of the driven-side gear, the baffle plate includes a wall portion extending more on the front side than the base portion of the baffle plate between the drive-side gear and the driven-side gear, and*

*wherein, as viewed from the direction of the rotation axis of the driven-side gear, the division wall is disposed to extend across the chain, and an outer periphery of the division wall is located on an outside in a radial direction of the baffle plate with the rotation axis as a reference.*

*7. The automatic transmission according to claim 6, the wall portion has a shape of which a width becomes narrower as it goes toward a distal end portion thereof.*

*8. The automatic transmission according to claim 6, wherein the baffle plate includes a compartment wall portion, and*

*wherein, as viewed from the direction of the rotational axis of the driven-side gear, the compartment wall portion includes a part positioned between the chain and a final gear, and*

*wherein, as viewed from the direction of the rotational axis of the driven-side gear, the wall portion includes a part positioned between the chain and the final gear.*

*9. The automatic transmission according to claim 6, wherein the wall portion includes, at a distal end thereof, a flat portion.*

*10. An automatic transmission comprising:*

*a division wall;*

*a drive-side gear;*

*a driven-side gear;*

*a chain which is wound on the drive-side gear and the driven-side gear; and*

*a baffle plate,*

*wherein the baffle plate is provided with a base portion which covers a range larger than an outer diameter of the chain,*

*wherein, as viewed from a direction of a rotational axis of the driven-side gear, the chain is positioned more on a front side than the base portion of the baffle plate,*

*wherein, as viewed from the direction of the rotational axis of the driven-side gear, an end surface of the division wall is positioned more on the front side than the base portion of the baffle plate,*

*wherein, as viewed from the direction of the rotational axis of the driven-side gear, the baffle plate includes a wall portion extending more on the front side than the base portion of the baffle plate, at a position close to the division wall, and*

*wherein, as viewed from the direction of the rotation axis of the driven-side gear, the division wall is disposed to extend across the chain, and an outer periphery of the division wall is located on an outside in a radial direction of the baffle plate with the rotation axis as a reference.*

*11. The automatic transmission according to claim 10, the wall portion has a shape of which a width becomes narrower as it goes toward a distal end portion thereof.*

*12. The automatic transmission according to claim 10, wherein the baffle plate includes a compartment wall portion, and*

*wherein, as viewed from the direction of the rotational axis of the driven-side gear, the compartment wall portion includes a part positioned between the chain and a final gear, and*

*wherein, as viewed from the direction of the rotational axis of the driven-side gear, the wall portion includes a part positioned between the chain and the final gear.*

*13. The automatic transmission according to claim 10, wherein the wall portion includes, at a distal end thereof, a flat portion.*

* * * * *